April 14, 1959  F. H. GOODING  2,882,492
APPARATUS FOR TESTING ELECTRIC CABLE INSULATION
Filed March 19, 1957
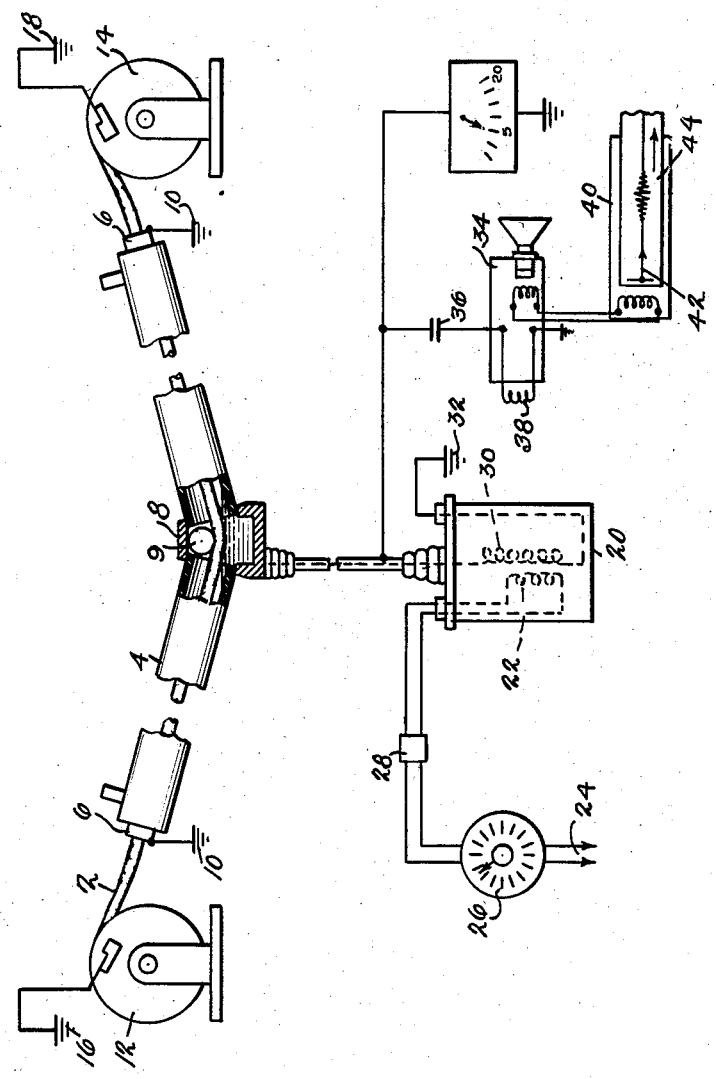
INVENTOR
Francis H. Gooding
BY
James G. Bethell
ATTORNEY United States Patent Office 2,882,492
Patented Apr. 14, 1959

2,882,492
APPARATUS FOR TESTING ELECTRIC CABLE INSULATION

Francis H. Gooding, Lodi, N.J., assignor to The Okonite Company, Passaic, N.J., a corporation of New Jersey Application March 19, 1957, Serial No. 647,119

6 Claims. (Cl. 324—54)

This invention relates to the ionization-testing of the insulation of electric wires and cables to determine the presence and location of defects in the insulation which might cause failure of the cable when operated at its rated operating voltage.

More specifically, the present invention provides an apparatus comprising a tube of insulation equipped at each end with a grounded stuffing box and midway of its length with a conducting section or electrode. The tube contains a vapor, which condenses on the surface of the insulation of a wire or cable as the latter is advanced through the tube, thereby to provide a semi-conducting film on the surface of the insulation. The conducting section of the tube is connected to one side of a high-voltage source. The other side of the high-voltage source is grounded.

As an insulated wire or cable, having its conductor grounded, progresses through said tube, with its insulation in constant contact with the grounded stuffing boxes and with the semi-conducting film of condensed vapor covering the insulation, a dielectric stress will be established on the insulation by the high-voltage source, this stress reaching its maximum at the conducting section of the tube.

An indicating device is connected between ground and that side of the high-voltage source which is connected to the conducting section of the insulating tube, and this device will show continuously the ionization characteristics of the insulation, so that an operator may observe any variation in the dielectric stress caused by the sudden ionization or local breakdown of an imperfection in the insulation which might eventually cause failure of the wire or cable at its rated operating voltage.

The accomanying drawing illustrates, in part section, an embodiment of my invention.

Referring to the drawing in detail, 2 designates an electric wire or cable the insulation of which is to be tested. 4 designates a tube of insulating material, equipped at each end with a stuffing box 6 and intermediate its ends with a conducting tubular section or electrode 8. The two stuffing boxes 6 are grounded, as shown at 10.

During testing, the wire or cable 2 is drawn from left-off reel 12 through the tube 4 and rewound upon take-up reel 14. The conductor of the wire or cable is grounded at the reels, as shown at 16 and 18.

The insulating tube contains a condensable vapor, such as wet steam, for example, and, as the wire or cable being tested passes through the tube, the vapor condenses on the surface of the insulation to provide a semi-conducting film along the insulation surface.

At each end of the conducting section or electrode 8 the insulating tube inclines upwardly to provide a sump at the electrode for collecting condensed vapor. At this sump I provide a contact roller 9 within the tube to provide a conducting path between the electrode 8 and the surface of the insulation being tested.

20 designates a transformer, the primary winding 22 of which is connected to a 60-cycle power source 24, through voltage regulator 26 and circuit breaker 28. The secondary of the transformer is designated 30. One side of this secondary is grounded, as shown at 32, while its other side is connected to the conducting section or electrode 8.

34 designates an aural device in the form of a radio receiver, connected through corona-free condenser 36 between ground and that side of the transformer secondary which is connected to the electrode 8 of the tube 4. The charging current of the condenser 36 is by-passed around the receiver 34 by connecting a small inductor 38 across the receiver terminals. The inductance of this inductor is sufficient to present a high impedance to the high-frequency corona currents but only a low impedance to the 60-cycle power current passing through the high-voltage condenser 36, so that the receiver 34 will respond only to the high-frequency corona voltage which is generated in the wire or cable when corona is initiated at a defect in the insulation.

Connected to the output of receiver 34 is a recording device, such as a recording galvanometer 40, for example, the needle and recording tape of which are designated 42 and 44, respectively.

In setting up this equipment for testing, the regulator 26 of the transformer 20 is set so that the voltage at the surface of the insulation of the wire or cable 2 at the electrode or conducting section 8 is preferably higher than the rated operating voltage of the wire or cable. For example, if the rated operating voltage of the wire or cable 2 is 12,000 volts, I prefer to set the regulator 26 for a voltage of, say, 18,000 volts.

It will be appreciated that, as the wire or cable 2 is advanced through the tube 4, its insulation will be subjected progressively to a dielectric stress, which reaches its maximum at the electrode 8, the stress progressively decreasing thereafter until the discharge end of the tube 4 is reached.

The devices 34 and 40, during the passage of the wire or cable through the tube 4, will show continuously the ionization characteristics of the insulation, so that any variation in the dielectric stress caused by the sudden ionization or local breakdown of an imperfection in the insulation which might eventually cause failure of the wire or cable at its rated operating voltage may be observed. It is to be understood that either one or both of the devices 34 and 40 may be employed.

It is to be further understood that changes may be made in the details of construction above described within the purview of my invention.

What I claim is:

1. An apparatus for the ionization-testing of the insulation of electric wires and cables, said apparatus comprising, in combination, an insulating tube provided intermediate its ends with a conducting section or electrode and at each end with a grounded stuffing box; means for continuously advancing an insulating wire or cable, having its conductor grounded, through said tube, with the insulation surface in continuous contact with said grounded stuffing boxes; a condensable vapor confined within said tube, said vapor condensing on the surface of the insulation to produce a semi-conducting film on the insulation surface; a high-voltage source having one side grounded and its other side connected to said conducting section or electrode, said vapor and its condensate having a sufficiently high total resistance to limit the leakage current along the insulation surface to within the capacity of the said high-voltage source; and an electrically operated device connected between ground and that side of the high-voltage source which is connected to said electrode, for showing continuously the ionization characteristics of the insulation of the wire or cable as it passes through said tube.

2. An apparatus for the ionization-testing of the insulation of electric wires and cables, said apparatus comprising, in combination, an insulating tube provided intermediate its ends with a conducting section or electrode and at each end with a grounded stuffing box; means for continuously advancing an insulated wire or cable, having its conductor grounded, through said tube, with the insulation surface in continuous contact with said grounded stuffing boxes; a condensable vapor confined within said tube, said vapor condensing on the surface of the insulation to produce a semi-conducting film on the insulation surface; a high-voltage source having one side grounded and its other side connected to said conducting section or electrode, said vapor and its condensate having a sufficiently high total resistance to limit the leakage current along the insulation surface to within the capacity of the said high-voltage source; and an electrically operated device connected between ground and that side of the high-voltage source which is connected to said electrode, for aurally showing continuously the ionization characteristics of the insulation of the wire or cable as it passes through said tube.

3. An apparatus for the ionization-testing of the insulation of electric wires and cables, said apparatus comprising, in combination, an insulating tube provided intermediate its ends with a conducting section or electrode and at each end with a grounded stuffing box; means for continuously advancing an insulated wire or cable, having its conductor grounded, through said tube, with the insulation surface in continuous contact with said grounded stuffing boxes; a condensable vapor confined within said tube, said vapor condensing on the surface of the insulation to produce a semi-conducting film on the insulation surface; a high-voltage source having one side grounded and its other side connected to said conducting section or electrode, said vapor and its condensate having a sufficiently high total resistance to limit the leakage current along the insulation surface to within the capacity of the said high-voltage source; and an electrically operated device connected between ground and that side of the high-voltage source which is connected to said electrode, for visually showing continuously the ionization characteristics of the insulation of the wire or cable as it passes through said tube.

4. An apparatus for the ionization-testing of the insulation of electric wires and cables, said apparatus comprising, in combination, an insulating tube provided intermediate its ends with a conducting section or electrode and at each end with a grounded stuffing box; means for continuously advancing an insulated wire or cable, having its conductor grounded, through said tube, with the insulation surface in continuous contact with said grounded stuffing boxes; a condensable vapor confined within said tube, said vapor condensing on the surface of the insulation to produce a semi-conducting film on the insulation surface; a high-voltage source having one side grounded and its other side connected to said conducting section or electrode, said vapor and its condensate having a sufficiently high total resistance to limit the leakage current along the insulation surface to within the capacity of the said high-voltage source; and an electrically operated device connected between ground and that side of the high-voltage source which is connected to said electrode, for visually recording continuously the ionization characteristics of the insulation of the wire or cable as it passes through said tube.

5. An apparatus for the ionization-testing of the insulation of electric wires and cables, said apparatus comprising, in combination, an insulating tube provided intermediate its ends with a conducting section or electrode and at each end with a grounded stuffing box; means for continuously advancing an insulated wire or cable, having its conductor grounded, through said tube, with the insulation surface in continuous contact with said grounded stuffing boxes; a condensable vapor confined within said tube, said vapor condensing on the surface of the insulation to produce a semi-conducting film on the insulation surface; a high-voltage transformer having one side of its secondary connected to ground and the other side connected to said electrode, said vapor and its condensate having a sufficiently high total resistance to limit the leakage current along the insulation surface to within the capacity of the said transformer; and an electrically operated device connected between ground and that side of the transformer secondary which is connected to said electrode for indicating continuously the ionization characteristics of the insulation of the wire or cable as it passes through said tube.

6. An apparatus for the ionization-testing of the insulation of electric wires and cables, said apparatus comprising, in combination, an insulating tube provided intermediate its ends with a conducting section or electrode and at each end with a grounded stuffing box; means for continuously advancing an insulated wire or cable, having its conductor grounded, through said tube, with the insulation surface in continuous contact with said grounded stuffing boxes; a condensable vapor confined within said tube, said vapor condensing on the surface of the insulation to produce a semi-conducting film on the insulation surface, said tube at each end of said electrode inclining upwardly to provide a sump for the reception of condensed vapor at the electrode; a high-voltage transformer having one side of its secondary grounded and the other side connected to said electrode, said vapor and its condensate having a sufficiently high total resistance to limit the leakage current along the insulation surface to within the capacity of the said transformer; and an electrically operated device connected between ground and that side of the transformer secondary which is connected to said electrode for showing continuously the ionization characteristics of the insulation of the wire or cable as it passes through said tube.

References Cited in the file of this patent
UNITED STATES PATENTS

| | | |
|---|---|---|
| 687,517 | Clark et al. | Nov. 26, 1901 |
| 2,460,107 | Slade | Jan. 25, 1949 |
| 2,794,169 | Gooding | May 28, 1957 |